United States Patent
Kairy, Jr.

(10) Patent No.: US 11,746,949 B2
(45) Date of Patent: Sep. 5, 2023

(54) HEADPHONE HOLDING DEVICE

(71) Applicant: William Kairy, Jr., Napa, CA (US)

(72) Inventor: William Kairy, Jr., Napa, CA (US)

(*) Notice: Subject to any disclaimer, the term of this patent is extended or adjusted under 35 U.S.C. 154(b) by 0 days.

(21) Appl. No.: 17/147,193

(22) Filed: Jan. 12, 2021

(65) Prior Publication Data
US 2022/0221100 A1    Jul. 14, 2022

(51) Int. Cl.
*F16B 2/10* (2006.01)
*F16M 11/10* (2006.01)
*H04R 1/10* (2006.01)
*F16B 2/04* (2006.01)

(52) U.S. Cl.
CPC ............ *F16M 11/10* (2013.01); *H04R 1/1091* (2013.01); *F16B 2/04* (2013.01); *F16B 2/10* (2013.01)

(58) Field of Classification Search
USPC ....... 248/301, 304, 305, 306, 690, 691, 692, 248/230.4, 230.5, 230.6, 230.7, 231.51, 248/231.61, 231.71, 316.5, 316.6, 316.7
See application file for complete search history.

(56) References Cited

U.S. PATENT DOCUMENTS

| | | | | |
|---|---|---|---|---|
| 5,584,456 A * | 12/1996 | Stephens | ............... | A47C 1/143 24/339 |
| 6,409,131 B1 * | 6/2002 | Bentley | .................. | A01K 97/10 248/219.4 |
| 6,416,028 B1 * | 7/2002 | Miller | ................. | B66B 11/0253 187/414 |
| 7,254,915 B2 * | 8/2007 | Mrotek | .................. | A01K 97/01 248/227.1 |
| 8,362,346 B1 * | 1/2013 | Prozinski | ................. | G10D 9/00 84/379 |
| 2006/0226315 A1 * | 10/2006 | Beasley | ................... | A45B 1/00 248/229.13 |
| 2007/0007312 A1 * | 1/2007 | Kraus, Jr. | ............ | A47G 25/481 223/85 |

* cited by examiner

*Primary Examiner* — Alfred J Wujciak
(74) *Attorney, Agent, or Firm* — Savantek Patent Services; Ivan E. Rozek

(57) ABSTRACT

A headphone holder device that can attach to a microphone stand allowing a performer to remove his or her headphone and place it on the J shaped hook of the headphone holder device when needed and quickly retrieve the headphone and put it on his or her head as needed.

2 Claims, 5 Drawing Sheets

HEADPHONE HOLDING DEVICE

CROSS REFERENCE TO RELATED APPLICATIONS

Not Applicable.

STATEMENT REGARDING FEDERALLY SPONSORED RESEARCH OR DEVELOPMENT

Not Applicable.

DESCRIPTION OF ATTACHED APPENDIX

Not Applicable.

BACKGROUND OF THE INVENTION

This invention relates generally to the headphone accessories and more specifically to a headphone holding device that attaches to a microphone stand. When a performing artist is using a microphone, he or she often is wearing headphones to help the artist hear other accompanying musical renditions. In many situations, the artist needs to remove and the headphones at various points during a session and then put them back on again to resume the session. It would therefore be advantageous to have a headphone holding device in close proximity to the microphone so that the artist can easily remove and hang up the headphone on a support device that is attached to the microphone stand so that the performer does not have to leave the proximity of the microphone stand during a performance. One other advantage is that in recording studios musicians tend to hang their headphones on their microphone and this causes structural damage to the microphone stand and feedback, poor recording and issues because it is my experience at the microphone picks up the headphone sound and then repeats it infinitely unless the channel is muted. By putting the headphones lower it doesn't directly contact the microphone in any way.

BRIEF SUMMARY OF THE INVENTION

The primary object of the invention is to provide a headphone holding device that can be easily attached to a microphone stand that includes a J shaped member to secure the central portion of a headphone and a microphone stand attachment member that allows the headphone holder to be attached to either the threaded tube at the proximal end of the microphone stand, or clipped to the side wall of the tubular support member of the microphone stand.

Other objects and advantages of the present invention will become apparent from the following descriptions, taken in connection with the accompanying drawings, wherein, by way of illustration and example, an embodiment of the present invention is disclosed.

Disclosed is a headphone holding device comprising a microphone stand attachment member and a J shaped headphone holding member, said members attached to each other by a hinge assembly. The attachment member is a spring biased clip that allows the microphone attachment member to be easily attached or removed from the support pole of the microphone stand.

BRIEF DESCRIPTION OF THE DRAWINGS

The drawings constitute a part of this specification and include exemplary embodiments to the invention, which may be embodied in various forms. It is to be understood that in some instances various aspects of the invention may be shown exaggerated or enlarged to facilitate an understanding of the invention.

DETAILED DESCRIPTION OF THE PREFERRED EMBODIMENTS

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

Figure 1:
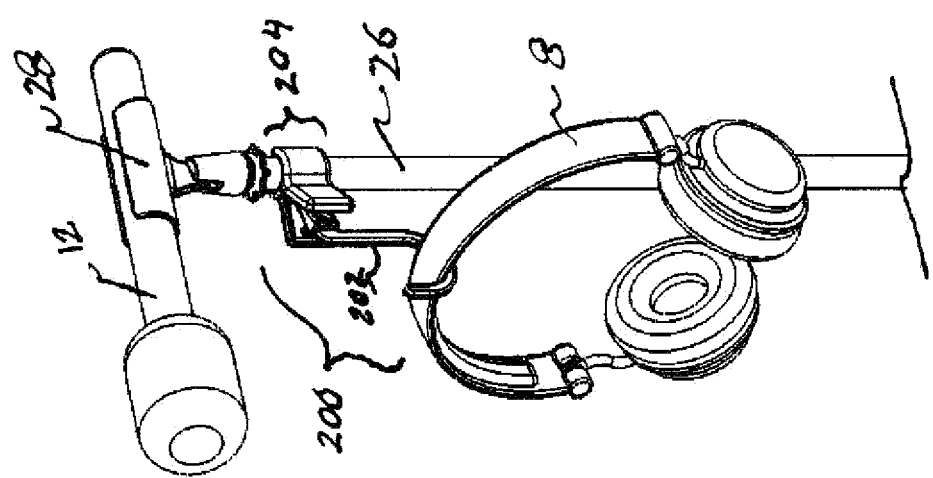
FIG. 1 is a perspective view of the clamp-on headphone holding device embodiment of the invention attached to a microphone stand.

FIG. 1 is a perspective view of the clamp-on headphone holding device embodiment 200. In this embodiment, the essentially J-shaped hook portion 202 is connected to headphone clamp-on adapter that is to the spring clip assembly 204, that allows the clamp-on headphone holding device 200 to be attached to the vertical elongated tubular member 26 of a microphone stand. This version 200 can be easily attached or removed as needed. Microphone cradle 28 and microphone 10 are mounted at the top of the vertical elongated tubular member 26 of a microphone stand.

Figure 2:
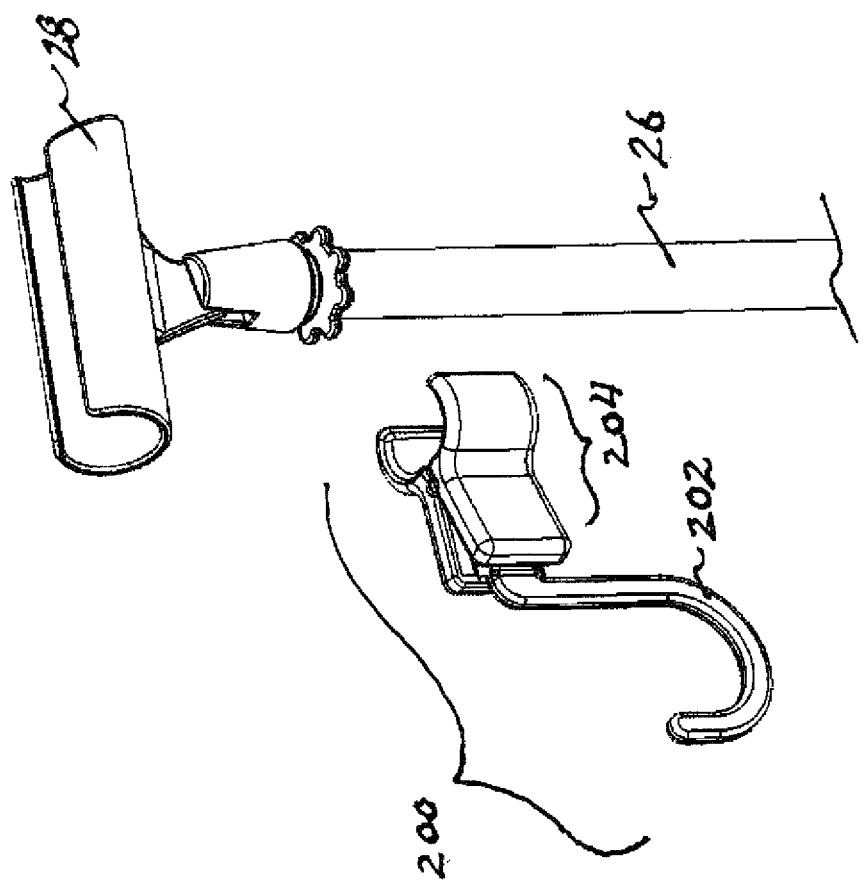
FIG. 2 is an exploded view of the clamp-on headphone holding device embodiment of the invention about to be attached to a microphone stand.

FIG. 2 is a perspective view of the clamp-on headphone holding device embodiment 200 about to be attached to the vertical tubular member 26 of a microphone stand.

Figure 3:
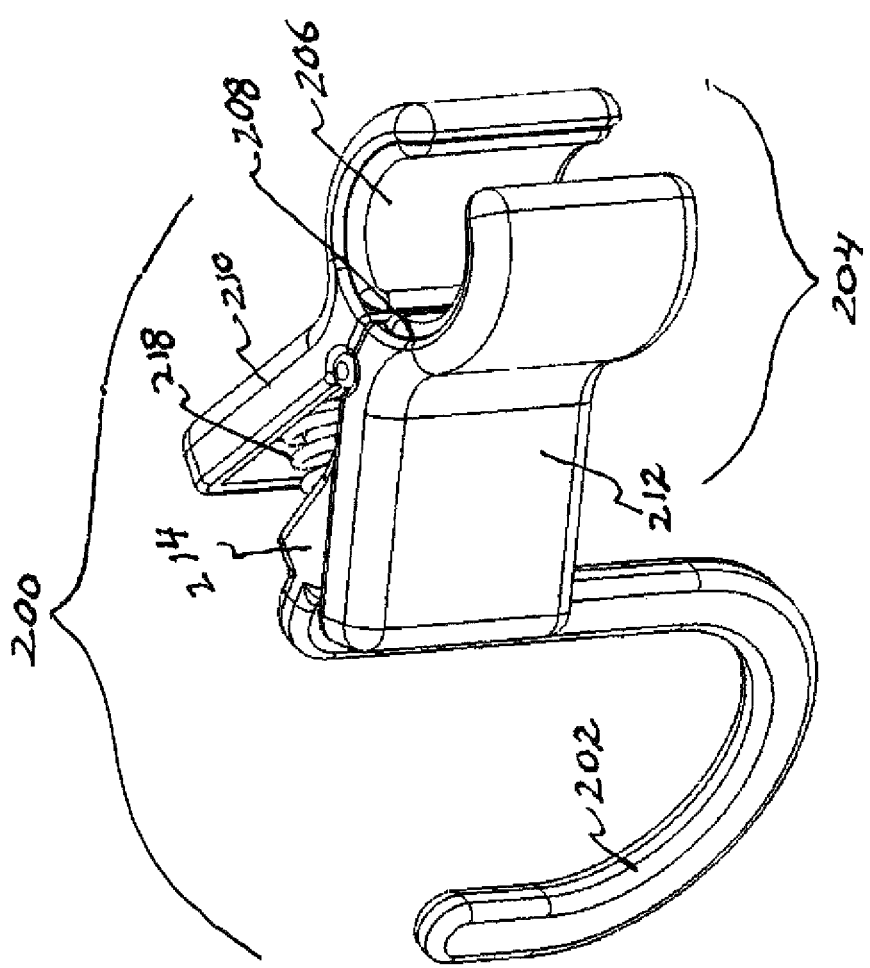
FIG. 3 is a perspective view of the clamp-on headphone holding device embodiment of the invention in the direction from the clamp-on attachment adapter toward the headphone hanger member.

FIG. 3 is a perspective view of the clamp-on headphone holding device embodiment 200 showing clip member 204 comprised of left clip 212 and right clip 210. The C shaped gripping portions include rubber inserts 206, 208 to ensure that the clip 204 does not slip on the microphone elongate tubular member 26. Compression spring 218 provides inward force for the two C shaped gripping members to firmly grasp the vertical tubular member 26.

Figure 4:
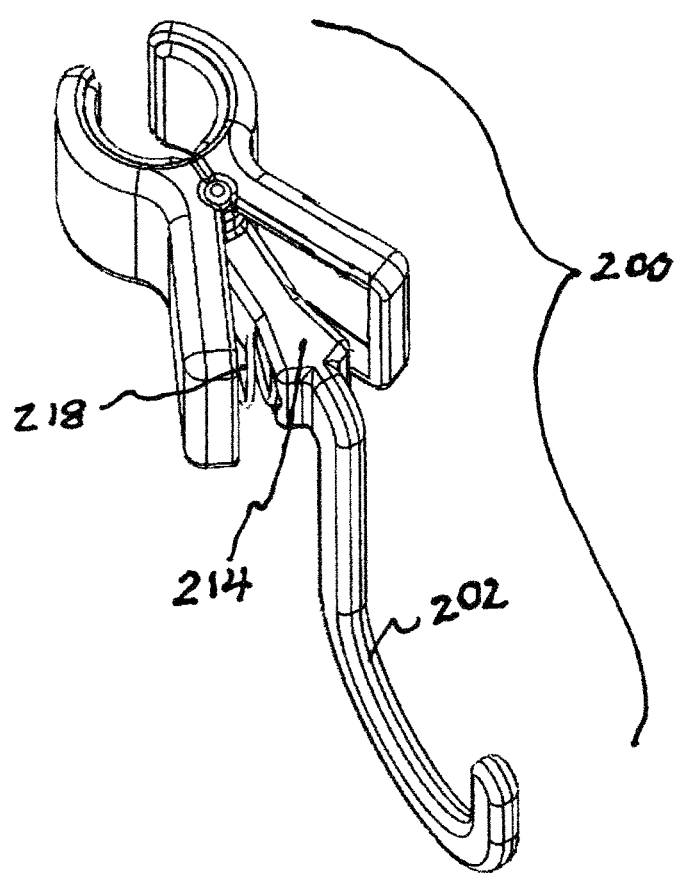
FIG. 4 is a perspective view of the clamp-on headphone holding device embodiment of the invention in the direction from the headphone hanger member toward the clamp-on attachment adapter member.

FIG. 4 is another perspective view of the clamp-on headphone holding device 200 showing additional detail of the J-shaped hook 202, one of the two springs 218 and of the pole attachment adapter connector portion 214. Only the spring 218 to the right of the adapter connector portion 214 is depicted on FIG. 4 and on FIG. 3 for clarity. Similarly, only the spring 218 to the left of the adapter connector portion 218 is depicted on FIG. 5.

Figure 5:
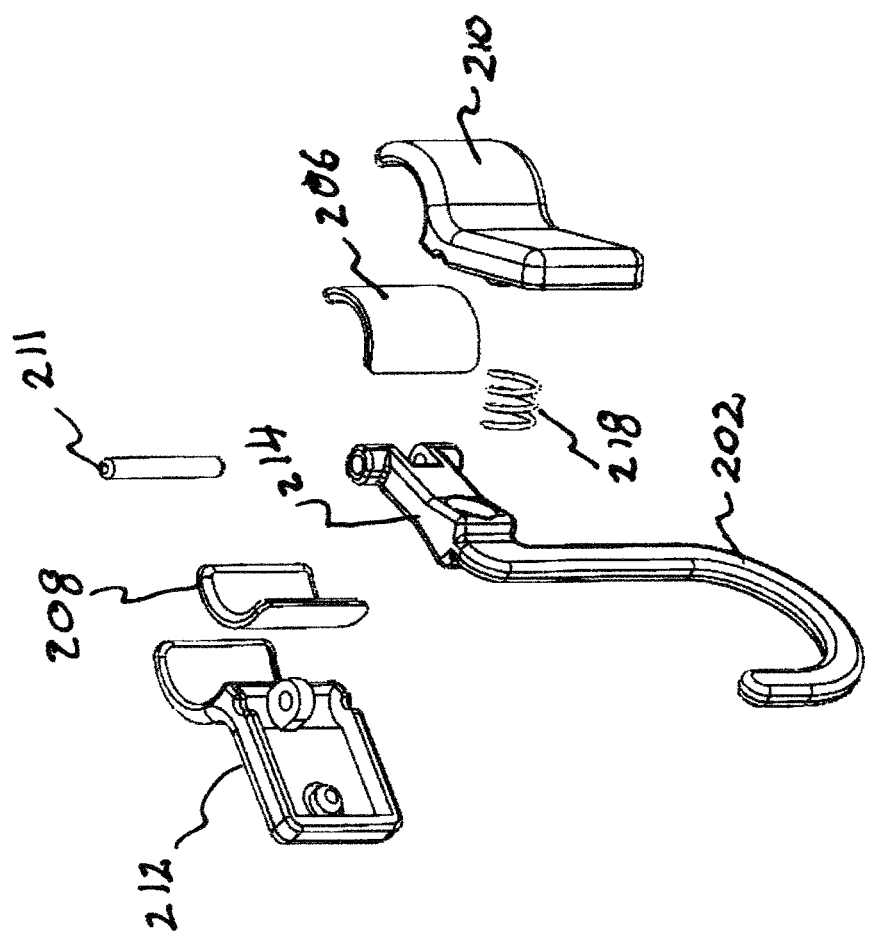
FIG. 5 is a perspective exploded view of clamp-on attachment adapter of the clamp-on headphone holding device.

FIG. 5 is an exploded perspective view of clamp-on headphone holding device 200 showing additional details of the pole attachment adapter connector portion 214 comprising an upper flat arm with a raised fitting and a lower flat arm with a raised fitting, the upper arm raised fitting and the lower arm raised fitting each comprising an aperture, the upper raised arm and lower raised arm apertures separated by a space sized to cradle the holding device left clamp part boss and the right clamp part boss when stacked on each other, the arm boss apertures and the pole attachment adapter apertures serving to accommodate the joining hinge pin.

It is to be understood that the described embodiment of the invention is illustrative and that modifications thereof may occur to those skilled in the art. Accordingly, this invention is not to be regarded as limited to the embodiments disclosed but is to be limited only as defined by the appended claims herein. It will further be understood that any features described in relation to any particular embodiment may be featured in combinations with other embodiments, for avoidance of doubt. While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. A clamp-on headphone holding device comprising a clamp-on attachment adapter, the clamp-on attachment adapter removably attachable to a microphone holding stand, the microphone holding stand comprising an elongated essentially tubular member, the tubular member comprising a bottom, a top, an outside diameter, and a microphone attached to the top, wherein the clamp-on attachment adapter comprises:

a headphone hanger member;
   a hinge pin;
   a left clamp part and a right clamp part, the left clamp part and the right clamp parts being mirror images of each other, the left clamp part and the right clamp part each comprising a squeeze paddle portion and a C-shaped gripping portion, the C-shaped gripping portion having an inside surface, the gripping portion inside surface diameter matched to the microphone holding stand outside diameter, wherein the C-shaped gripping portion inside surface being lined with a non-slippery lining;
   the left clamp part and the right clamp part each comprising a boss, each boss comprising an aperture for accommodating the hinge pin; and
   a compression spring disposed between the left clamp part paddle portion and the headphone hanger member or the compression spring is disposed between the right clamp part paddle portion and the headphone hanger member and the headphone hanger member, wherein the headphone hanger member is disposed between the left clamp part and right clamp part forcing the left clamp part squeeze paddle portion and the right clamp part squeeze paddle portion apart thereby forcing the C-shaped gripping portions inside surfaces to non-slidably grab the microphone stand elongated tubular member of the microphone holding stand whilst the compression spring is not being squeezed by a user via the left clamp part squeeze paddle portion and the right clamp part squeeze paddle portion.

2. The clamp-on headphone holding device of claim 1, wherein the headphone hanger member comprises:

an essentially J-shaped hook portion and a pole attachment adapter connector portion, the J-shaped hook portion being essentially parallel to the microphone holding stand, the pole attachment adapter connector portion, comprising an upper flat arm and a lower flat arm, the upper flat arm and the lower flat arm disposed at an essentially right angle to the J-shaped hook portion, the upper flat arm and the lower flat arm furthermore being essentially parallel to each other, separated by a space sufficient to cradle the holding device left clamp part and the right clamp part bosses stacked on top of each other;
   wherein furthermore the pole attachment connector portion comprises an upper raised fitting and a lower raised fitting, the upper raised fitting and the lower raised fitting each comprising an aperture for accommodating the hinge pin, the upper raised fitting and the lower raised fitting disposed on the upper flat arm and on the lower flat arm respectively; and
   the clamp-on attachment adapter being joined to the headphone hanger member by inserting the hinge pin through the apertures disposed in the upper connector flat arm fitting and in the lower connector flat arm fitting while the left clamp arm boss aperture and the right clamp arm boss aperture are aligned with the apertures disposed in the upper connector flat arm fitting and in the lower connector flat arm fitting.

* * * * *